United States Patent
Ogawa et al.

(10) Patent No.: US 11,349,412 B2
(45) Date of Patent: May 31, 2022

(54) THREE-PHASE AC CONTROL APPARATUS AND THREE-PHASE AC CONTROL SYSTEM

(71) Applicant: NABTESCO CORPORATION, Tokyo (JP)

(72) Inventors: Takashi Ogawa, Tokyo (JP); Takayuki Jinno, Tokyo (JP); Yoshiaki Okuno, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 16/711,720

(22) Filed: Dec. 12, 2019

(65) Prior Publication Data

US 2020/0195167 A1 Jun. 18, 2020

(30) Foreign Application Priority Data

Dec. 13, 2018 (JP) .............................. JP2018-233468

(51) Int. Cl.
*H02M 7/5395* (2006.01)
*H02M 1/44* (2007.01)

(52) U.S. Cl.
CPC ........... *H02M 7/5395* (2013.01); *H02M 1/44* (2013.01)

(58) Field of Classification Search
CPC .......... H02M 1/38; H02M 1/385; H02M 1/44; H02M 7/537; H02M 7/5387–5395
See application file for complete search history.

(56) References Cited

U.S. PATENT DOCUMENTS

| | | | | |
|---|---|---|---|---|
| 9,444,369 | B2* | 9/2016 | Suzuki | .............. H02M 7/53875 |
| 2004/0195995 | A1* | 10/2004 | Quirion | ............ H02M 7/53875 318/811 |
| 2015/0075898 | A1 | 3/2015 | Suzuki | |
| 2015/0303844 | A1* | 10/2015 | Ajima | ..................... H02P 21/14 318/400.13 |
| 2017/0025973 | A1* | 1/2017 | Sugiyama | ............... H02P 6/085 |
| 2018/0159458 | A1* | 6/2018 | Shouji | ..................... H02P 21/18 |
| 2019/0068098 | A1* | 2/2019 | Iijima | ................. H02M 7/5395 |
| 2020/0252012 | A1* | 8/2020 | Hidaka | ............... H02P 29/0241 |

FOREIGN PATENT DOCUMENTS

| | | |
|---|---|---|
| DE | 112015001287 T5 | 1/2017 |
| JP | 2008228554 A | 9/2008 |
| WO | WO-2017154239 A1 * 9/2017 .............. H02P 21/18 |

OTHER PUBLICATIONS

French Search Report for corresponding FR Application No. FR1913793; dated Apr. 1, 2022.

* cited by examiner

*Primary Examiner* — Fred E Finch, III
(74) *Attorney, Agent, or Firm* — Cantor Colburn LLP (57) ABSTRACT

A three-phase AC control apparatus includes: an equal duty sensing circuit; and a PWM signal control circuit. The equal duty sensing circuit senses whether any two of a U-phase, a V-phase, and a W-phase of a three-phase AC current have an equal duty value. The PWM signal control circuit outputs, when it is sensed that any two of the U-phase, the V-phase, and the W-phase of the three-phase AC current have the equal duty value, a control signal that shifts a timing of start and a timing of stop of one of the two phases having the equal duty value.

2 Claims, 5 Drawing Sheets

FIG.5

THREE-PHASE AC CONTROL APPARATUS AND THREE-PHASE AC CONTROL SYSTEM

CROSS REFERENCE TO RELATED APPLICATIONS

The present application claims priority under 35 U.S.C. § 119 to Japanese Patent Application 2018-233468, filed on Dec. 13, 2018, the entire contents of which being incorporated herein by reference.

BACKGROUND OF THE INVENTION

1. Field of the Invention

The present invention relates to three-phase AC control apparatus and three-phase AC control systems.

2. Description of the Related Art

An inverter circuit converts a DC current into an AC current of a suitable frequency and supplies the AC current to a motor. A lot of inverters use pulse width modulation (PWM) to control the output current. PWM generates an on-off pulse signal from an input of a constant current and controls the output current by changing the on duration (hereinafter referred to as "duty value").

[Patent literature 1] JP2008-228554

A pulse signal that defines a duty value in PWM will include noise generated due to switching at a point of time of rising (hereinafter, referred to as "rising edge") and a point of time of falling (hereinafter, referred to as "falling edge"; the rising edge and the falling edge are generically referred to as "edges"). The noise does not present a serious problem in the case the duty values of a three-phase AC current generated differ. In the case that the duty values of two phases are equal to each other, however, two noises are generated at the same point of time. This causes the noises to be superimposed on each other. The magnitude of the resultant noise may sometimes be larger than the sum of the two noises. In the case of transportation equipment such as aircraft, for example, such noise may cause malfunction of the equipment.

The technology disclosed in patent literature 1 inhibits a periodic change caused by a frequency change in the PWM carrier from appearing in the output current waveform of a power converter, by changing the current control gain used to convert a current command value into a voltage command value in accordance with a frequency change in the PWM carrier. However, although the technology can inhibit a periodic change from appearing due to a frequency change in the PWM carrier, it cannot reduce the noise itself caused by switching.

SUMMARY OF THE INVENTION

The present invention addresses the above-described issue, and a general purpose thereof is to reduce the noise generated when the duty values of two phases of an AC current generated by using PWM are equal to each other.

A three-phase AC control apparatus according to an embodiment of the present invention includes: an equal duty sensing circuit that senses whether any two of a U-phase, a V-phase, and a W-phase of a three-phase AC current have an equal duty value; and a PWM signal control circuit that, when the equal duty sensing circuit senses that any two of the U-phase, the V-phase, and the W-phase of the three-phase AC current have the equal duty value, outputs a control signal that shifts a timing of start and a timing of stop of one of the two phases having the equal duty value.

Another embodiment of the present invention relates to a system. The system includes: a first three-phase AC control apparatus including: a first equal duty sensing circuit that senses whether a U-phase and a V-phase of a three-phase AC current have an equal duty value; and a PWM signal control circuit that, when it is sensed that the U-phase and the V-phase have the equal duty value, outputs a first control signal that shifts a timing of start and a timing of stop of the U-phase to a PWM signal generation apparatus; a second three-phase AC control apparatus including: a second equal duty sensing circuit that senses whether the V-phase and a W-phase of the three-phase AC current have an equal duty value; and a second PWM signal control circuit that, when it is sensed that the V-phase and the W-phase have the equal duty value, outputs a second control signal that shifts a timing of start and a timing of stop of the V-phase to the PWM signal generation apparatus; a third three-phase AC control apparatus including: a third equal duty sensing circuit that senses whether the W-phase and the U-phase of the three-phase AC current have an equal duty value; and a third PWM signal control circuit that, when it is sensed that the W-phase and the U-phase have the equal duty value, outputs a third control signal that shifts a timing of start and a timing of stop of the W-phase to the PWM signal generation apparatus; and the PWM signal generation apparatus that generates a PWM signal based on the first control signal, the second control signal, and the third control signal.

Optional combinations of the aforementioned constituting elements, and implementations of the invention replacement of constituting elements in the form of methods, devices, programs, transitory or non-transitory recording mediums storing programs, systems, etc. may also be practiced as optional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Hereinafter, the present invention will be described based on preferred embodiments with reference to the accompanying drawings. Identical or like constituting elements, members, processes shown in the drawings are represented by identical symbols and a duplicate description will be omitted.

An explanation of the basic knowledge will be given with reference to FIG. 1 before describing a specific embodiment.

Figure 1:
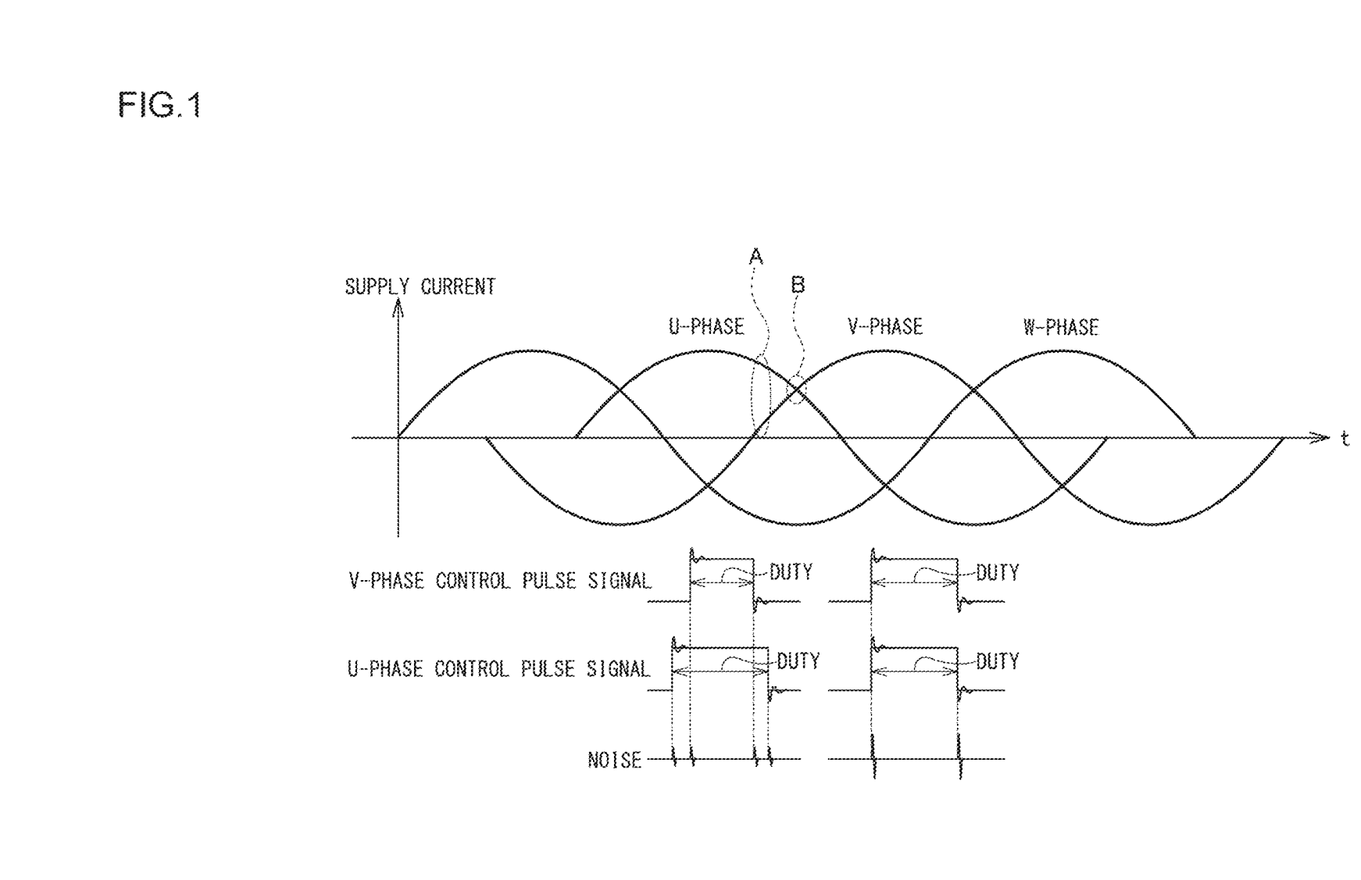
FIG. 1 is a graph showing the U-phase, V-phase, and W-phase of a supply current and noise generated at the edges of the pulse signal controlling the U-phase and the V-phase.

The topmost row in FIG. 1 shows the waveforms of the U-phase, V-phase, and W-phase of a three-phase AC current supplied from an inverter circuit to a motor. The second row from top in FIG. 1 shows a V-phase control pulse signal in time zones A and B. The third row from top in FIG. 1 shows a U-phase control pulse signal in time zones A and B. The bottom row in FIG. 1 shows noise observed in time zones A and B.

As shown in the second and third rows from top in FIG. 1, noise that accompanies switching is generated at the rising edge and the falling edge of the pulse signal in both the U-phase and the V-phase.

As shown in the topmost row in FIG. 1, the current value of the U-phase is larger than that of the V-phase in time zone A. Therefore, the duty value of the U-phase is larger than the duty value of the V-phase. As shown in the lowermost row in FIG. 1, the duty values of the U-phase and the V-phase differ in time zone A. Therefore, noises are generated at four points of time (the rising edge of the U-phase, the rising edge of the V-phase, the falling edge of the V-phase, and the falling edge of the U-phase in the stated order). These four noises are generated at different points of time and so are not superimposed on each other.

Meanwhile, the current values of the U-phase and the V-phase are equal to each other in time zone B. Therefore, the duty value of the U-phase is equal to the duty value of the V-phase. As shown in the lowermost row in FIG. 1, the duty values of the U-phase and the V-phase are equal to each other in time zone B. Therefore, noises are generated at two points of time (the rising edges of the U-phase and the V-phase and the falling edges of the U-phase and the V-phase in the stated order). Each of these two noises results from superimposition of the noises generated in the U-phase and the V-phase.

The noise resultant from the superimposition may be larger than the sum of the two noises due to the non-linear effect, etc. In the field of transportation equipment such as aircraft, in particular, such noise may cause malfunction of the equipment and so should be reduced as much as possible. We have realized that, in the case the duty values of two phase of a three-phase AC current are equal to each other, the timing of generation of noise can be shifted to avoid superimposition of the noise accordingly, by shifting the timing of start and the timing of stop of one of the two phases.

First Embodiment

Figure 2:
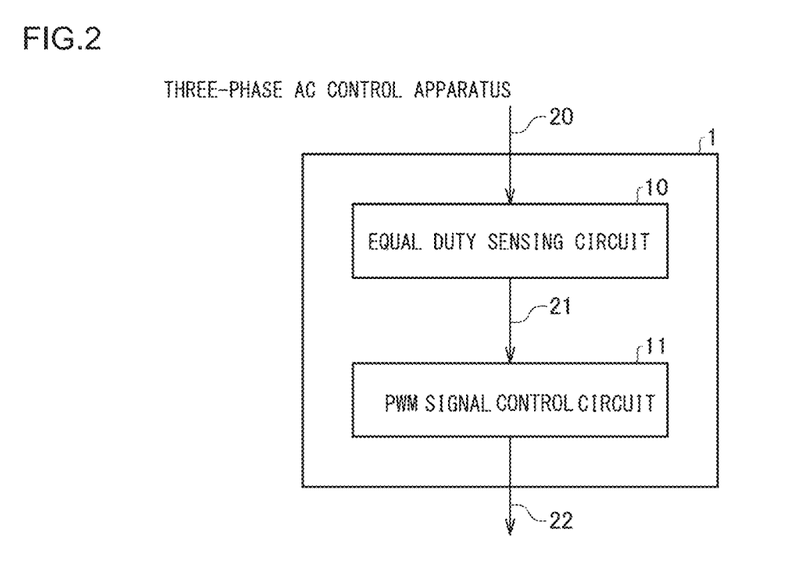
FIG. 2 is a functional block diagram showing a configuration of a three-phase AC control apparatus according to the first embodiment.

FIG. 2 is a functional block diagram showing a configuration of a three-phase AC control apparatus 1 according to the first embodiment; The three-phase AC control apparatus 1 is provided with an equal duty sensing circuit 10 and a PWM signal control circuit 11.

The three-phase AC control apparatus 1 compares the duty values of two phases of the U-phase, V-phase, and W-phase of a three-phase AC current and controls the timing of start and the timing of stop of one of the two phases in accordance with the result of comparison. A description will be given below of an example in which the duty values of the U-phase and V-phase are compared and the timing of start and the timing of stop of the U-phase is controlled in accordance with the result of comparison. However, the embodiment is non-limiting as to selection of phases. A combination of two arbitrary phases selected from the U-phase, V-phase, and W-phase may be subject to comparison. Further, in the case the duty values of the U-phase and the V-phase are compared, for example, the phase for which the timing of start and the timing of stop are controlled in accordance with the result of comparison may be the V-phase instead of the U-phase.

When the duty value in a given period of PWM is determined, the equal duty sensing circuit 10 stores the duty value of the U-phase as the duty value of phase relevant to the duty sensing circuit 10. At the same point of time, the duty value of the V-phase is input to the equal duty sensing circuit 10 as a further phase duty value 20. The equal duty sensing circuit 10 compares the duty values of the U-phase and the V-phase.

In the case the duty values of the U-phase and the V-phase are equal to each other, the equal duty sensing circuit 10 outputs an edge overlapping avoidance function ON signal 21 to the PWM signal control circuit 11.

When the edge overlapping avoidance function ON signal 21 is input, the PWM signal control circuit 11 outputs a control signal 22 for shifting the timing of start and the timing of stop of the U-phase.

A description will now be given of a manner of controlling a PWM signal by the three-phase AC control apparatus 1 with reference to FIG. 3 and FIG. 4. The signal waveforms in FIG. 3 and FIG. 4 are those of the U-phase of a three-phase AC current.

Figure 3:
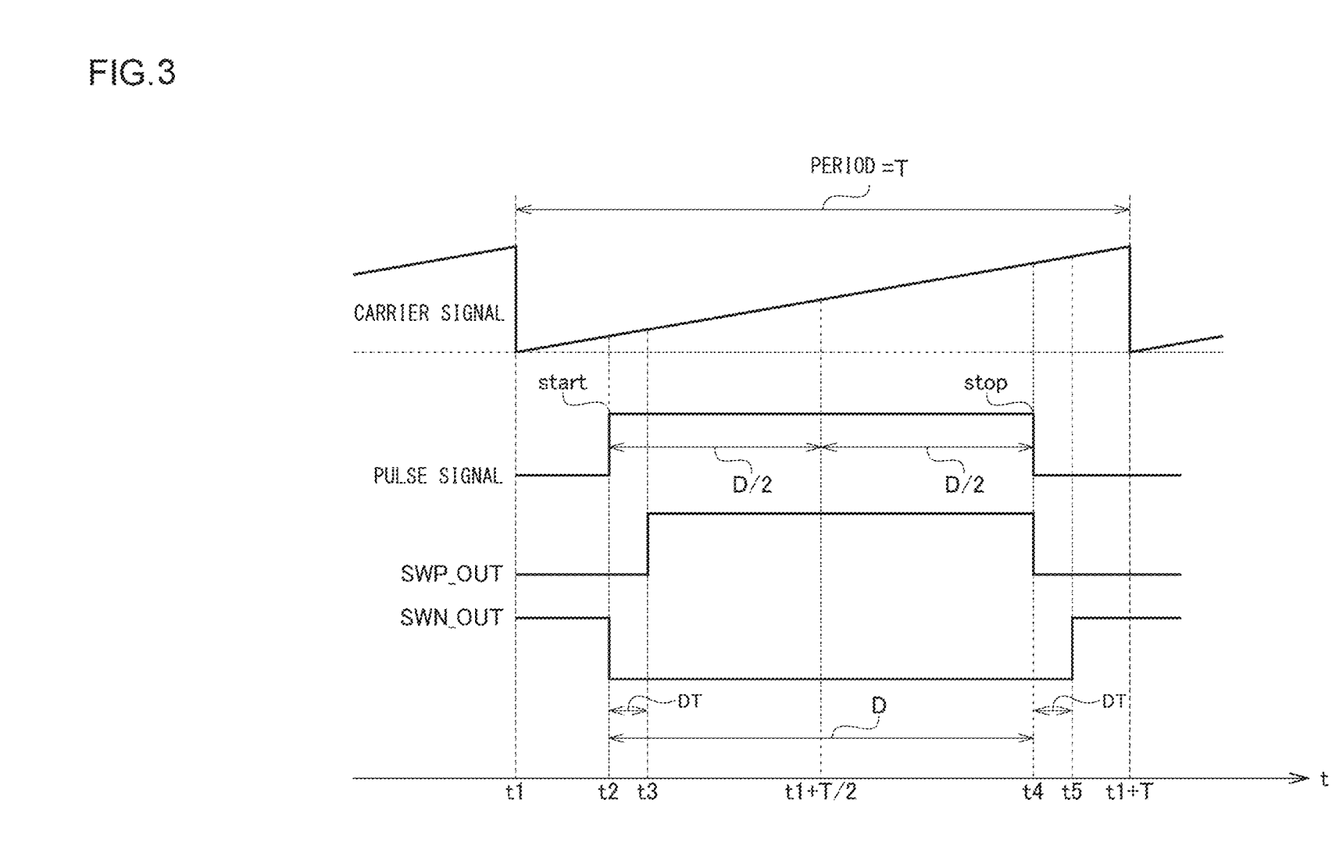
FIG. 3 is a graph showing the waveform of a PWM control signal occurring before the timing of start and the timing of stop are shifted.

FIG. 3 is a graph showing the waveform of a PWM control signal occurring before the timing of start and the timing of stop are shifted. FIG. 4 is a graph showing the waveform of a PWM control signal occurring after the timing of start and the timing of stop are shifted.

Figure 4:
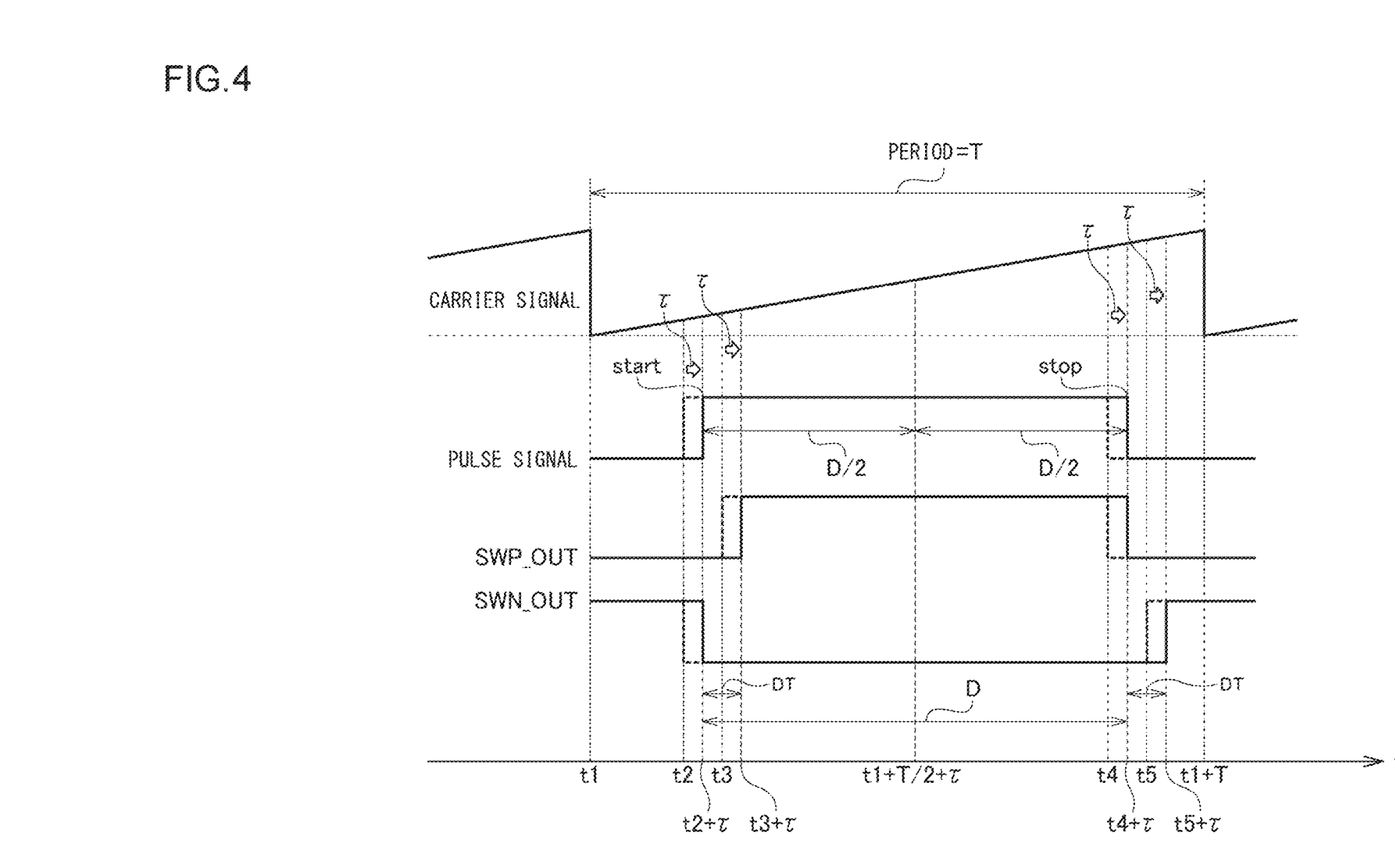
FIG. 4 is a graph showing the waveform of a PWM control signal occurring after the timing of start and the timing of stop are shifted.

The topmost rows in FIG. 3 and FIG. 4 show the carrier signal of PWM. The period T of the carrier signal represents the period of PWM. In this case, it is assumed that a given PWM period starts at a point of time t1 and ends at a point of time t1+T.

As is well known, the carrier signal having a saw-tooth waveform and the signal wave having a sinusoidal waveform are compared. When the comparison reveals that the signal wave is larger than the carrier signal, the transistors on the high side and the low side are turned on to provide a logical high output.

The second row from top in FIG. 3 shows a pulse signal occurring before the timing of start and the timing of stop are shifted. The waveform toward the top represents ON, and the waveform toward the bottom represents OFF (the same hereinafter).

Hereinafter, the duty value in the PWM period of FIG. 3 will be denoted by D. The pulse signal is formed to extend symmetrically before and after the point of time t1+T/2 at the center of the PWM period by a time D/2. Denoting the point of time of the rising edge (start time) of the pulse signal by t2, t2=t1+T/2−D/2. Also, denoting the point of time of the falling edge (stop time) of the pulse signal by t4, t4=t1+T/2+D/2. In other words, the pulse signal is in an off state between time t1 and time t2, is in an on state between time t2 and time t4, and is in an off state between time t4 and time t1+T.

The third and fourth rows from top in FIG. 3 show the on-off waveform SWP_OUT of the high-side transistor and the on-off waveform SWN_OUT of the low-side transistor, respectively occurring before the timing of start and the timing of stop are shifted.

As shown in FIG. 3, SWP_OUT is in an off state between time t1 and time t3, is in an on state between time t3 and time t4, and is in an off state between time t4 and time t1+T. Further, SWN_OUT is in an on state between time t1 and time t2, is in an off state between time t2 and time t5, and is in an on state between time t5 and time t1+T.

For the purpose of preventing a through current from flowing from the high side to the low side during switching, the transistors are configured such that SWP_OUT and SWN_OUT are both in an off state in a period between time t2 and time t3 and in a period between time t4 and time t5. These periods are called "dead time" and is denoted by DT in this specification.

Accordingly, SWP_OUT rises after an elapse of a time DT since the rising edge of the pulse signal and falls concurrently with the falling of the pulse signal. Further, SWN_OUT falls concurrently with the rising of the pulse signal and rises after an elapse of a time DT since the falling of the pulse signal.

The second row from top in FIG. 4 shows a pulse signal occurring after the timing of start and the timing of stop are shifted by the three-phase AC control apparatus 1.

As shown in FIG. 4, the timing of start and the timing of stop of the pulse signal are shifted so as to be delayed by a time τ from the timing of FIG. 3. In other words, the pulse signal is formed to extend symmetrically before and after the point of time t1+T/2+τ by a time D/2. The point of time of the rising edge (start time) of the pulse signal is t2+−r=t1+T/2−D/2+τ. Further, the point of time of the falling edge (stop time) of the pulse signal is t4+τ=t1+T/2+D/2+τ. In other words, the pulse signal is in an off state between time t1 and time t2+t, is in an on state between time t2+T and time t4+t, and is in an off state between time t4+T and time t1+T.

The third and fourth rows from top in FIG. 4 show the on-off waveform SWP_OUT of the high-side transistor and the on-off waveform SWN_OUT of the low-side transistor, respectively, occurring after the timing of start and the timing of stop are shifted by the three-phase AC control apparatus 1.

As shown in FIG. 4, the timing of start and the timing of stop of both SWP_OUT and SWN_OUT are shifted so as to be delayed by a time τ from the timing of FIG. 3. In other words, SWP_OUT is in an off state between time t1 and time t3+τ, is in an on state between time t3+τ and time t4+τ, and is in an off state between time t4+τ and time t1+T. Further, SWN_OUT is in an on state between time t1 and time t2+τ, is in an off state between time t2+τ and time t5+τ, and is in an on state between time t5+τ and time t1+T.

The period of time between time t2+τ and time t3+τ and the period of time between time t4+τ and time t5+τ are dead time.

In order to secure the later dead time, the time τ needs to meet τ<T/2−D/2−DT.

So long as the above relationship is met, τ may be an arbitrary value. In particular, τ may be an integral multiple of the clock count.

As described above, the timing of start and the timing of stop of the U-phase are shifted so as to be delayed by the time τ from the V-phase, in the case the duty values of the U-phase and the V-phase are equal to each other. In other words, the entirety of the pulse signal of the U-phase is shifted backward by the time τ with respect to the V-phase. As a result, the timing of generation of the noise in the U-phase and that of the V-phase are shifted so that superimposition of the noise is avoided.

According to this embodiment, it is possible to reduce the noise generated when the duty values of two phases of an AC current generated by using PWM are equal to each other.

Second Embodiment

As in the first embodiment, the three-phase AC control apparatus 1 according to the second embodiment is provided with an equal duty sensing circuit 10 and a PWM signal control circuit 11.

The equal duty sensing circuit 10 compares the duty values of the U-phase and the V-phase, the duty values of the V-phase and the W-phase, and the duty values of the W-phase and the U-phase.

In the case the duty values of the U-phase and the V-phase are equal to each other, the equal duty sensing circuit 10 outputs a U-phase edge overlapping avoidance function ON signal to the PWM signal control circuit 11. In the case the duty values of the V-phase and the W-phase are equal to each other, the equal duty sensing circuit 10 outputs a V-phase edge overlapping avoidance function ON signal to the PWM signal control circuit 11. In the case the duty values of the W-phase and the U-phase are equal to each other, the equal duty sensing circuit 10 outputs a W-phase edge overlapping avoidance function ON signal to the PWM signal control circuit 11.

When the U-phase edge overlapping avoidance function ON signal is input, the PWM signal control circuit 11 outputs a control signal for shifting the timing of start and the timing of stop of the U-phase. When the V-phase edge overlapping avoidance function ON signal is input, the PWM signal control circuit 11 outputs a control signal for shifting the timing of start and the timing of stop of the V-phase. When the W-phase edge overlapping avoidance function ON signal is input, the PWM signal control circuit 11 outputs a control signal for shifting the timing of start and the timing of stop of the W-phase.

The other aspects of the operation of the three-phase AC control apparatus 1 according to the second embodiment are commonly provided in the three-phase AC control apparatus 1 according to the first embodiment.

According to this embodiment, it is possible to reduce the noise generated when the duty values of two of the phases of an AC current generated by using PWM are equal to each other such that the U-phase, V-phase, and W-phase are evenly controlled.

Third Embodiment

Figure 5:
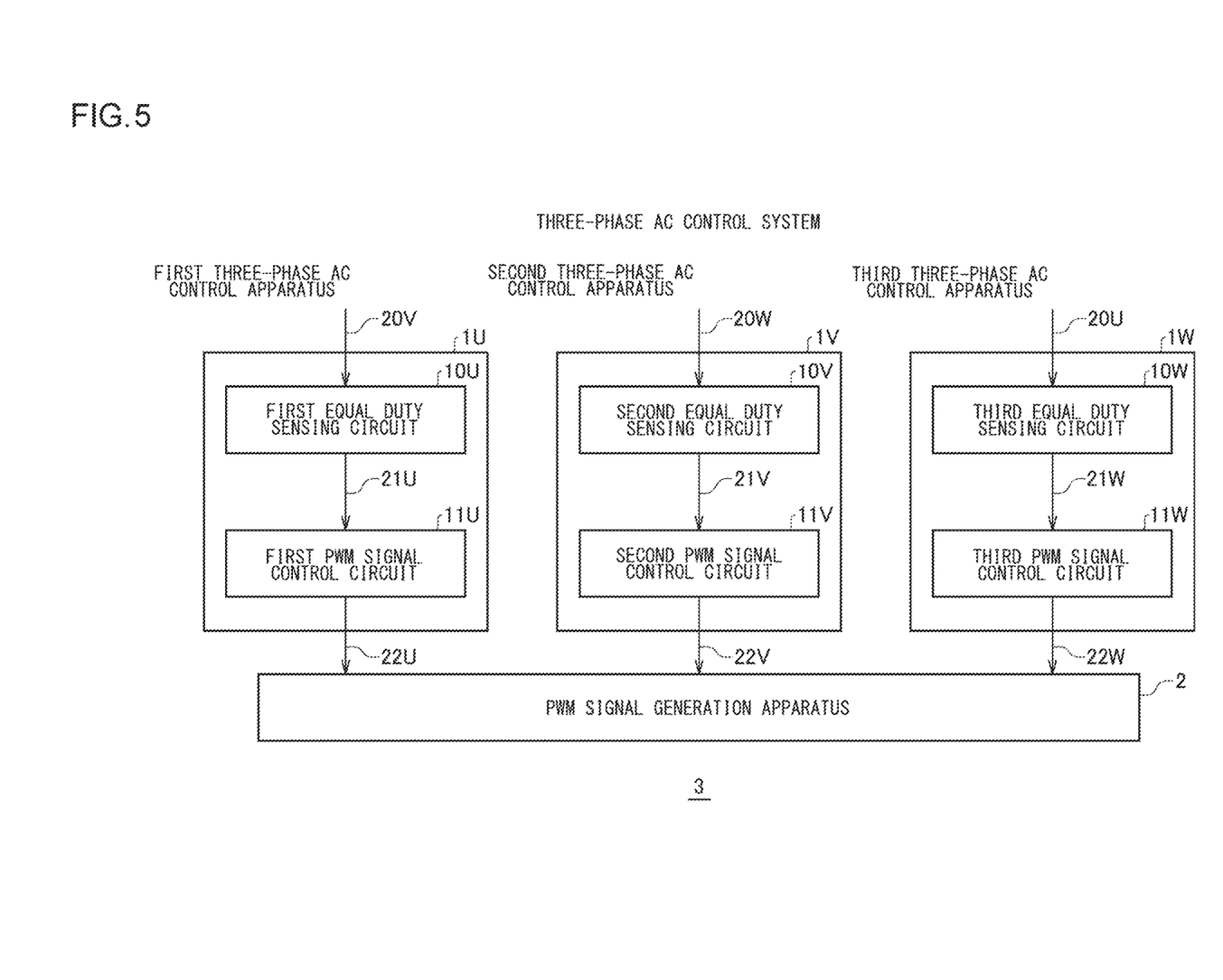
FIG. 5 is a functional block diagram showing a configuration of a three-phase AC control system according to the third embodiment.

FIG. 5 is a functional block diagram showing a configuration of a three-phase AC control system 3 according to the third embodiment. The three-phase AC control system 3 is provided with a first three-phase AC control apparatus 1U, a second three-phase AC control apparatus 1V, a third three-phase AC control apparatus 1W, and a PWM signal generation apparatus 2.

The first three-phase AC control apparatus 1U is provided with a first equal duty sensing circuit 10U and a first PWM signal control circuit 11U. The second three-phase AC control apparatus 1V is provided with a second equal duty sensing circuit 10V and a second PWM signal control circuit 11V. The third three-phase AC control apparatus 1W is provided with a third equal duty sensing circuit 10W and a third PWM signal control circuit 11W.

When the duty value in a given period of PWM is determined, the first equal duty sensing circuit 10U stores the duty value of the U-phase as the duty value of relevant phase. At the same point of time, the duty value of the V-phase is input to the first equal duty sensing circuit 10U as a first further phase duty value 20V. The first equal duty sensing circuit 10U compares the duty values of the U-phase and the V-phase.

In the case the duty values of the U-phase and the V-phase are equal to each other, the first equal duty sensing circuit 10U outputs a first edge overlapping avoidance function ON signal 21U to the first PWM signal control circuit 11U.

When the first edge overlapping avoidance function ON signal 21U is input, the first PWM signal control circuit 11U outputs a first control signal 22U for shifting the timing of start and the timing of stop of the U-phase to the PWM signal generation apparatus 2.

When the duty value in a given period of PWM is determined, the second equal duty sensing circuit 10V stores the duty value of the V-phase as the duty value of relevant phase. At the same point of time, the duty value of the W-phase is input to the second equal duty sensing circuit 10V as a second further phase duty value 20W. The second equal duty sensing circuit 10V compares the duty values of the V-phase and the W-phase.

In the case the duty values of the V-phase and the W-phase are equal to each other, the second equal duty sensing circuit 10V outputs a second edge overlapping avoidance function ON signal 21V to the second PWM signal control circuit 11V.

When the second edge overlapping avoidance function ON signal 21V is input, the second PWM signal control circuit 11V outputs a second control signal 22V for shifting the timing of start and the timing of stop of the V-phase to the PWM signal generation apparatus 2.

When the duty value in a given period of PWM is determined, the third equal duty sensing circuit 10W stores the duty value of the W-phase as the duty value of relevant phase. At the same point of time, the duty value of the U-phase is input to the third equal duty sensing circuit 10W as a third further phase duty value 20U. The third equal duty sensing circuit 10W compares the duty values of the W-phase and the U-phase.

In the case the duty values of the W-phase and the U-phase are equal to each other, the third equal duty sensing circuit 10W outputs a third edge overlapping avoidance function ON signal 21W to the third PWM signal control circuit 11W.

When the third edge overlapping avoidance function ON signal 21W is input, the third PWM signal control circuit 11W outputs a third control signal 22W for shifting the timing of start and the timing of stop of the W-phase to the PWM signal generation apparatus 2.

The PWM signal generation apparatus 2 generates a PWM signal controlled to prevent overlapping of the noise at the edges, based on the first control signal 22U, the second control signal 22V, and the third control signal 22W.

According to this embodiment, it is possible to generate a PWM signal that reduces the noise generated when the duty values of two phases of an AC current generated by using PWM are equal to each other.

Described above is an explanation based on an exemplary embodiment. The embodiments are intended to be illustrative only and it will be understood by those skilled in the art that variations and modifications are possible within the claim scope of the present invention and that such variations and modifications are also within the claim scope of the present invention. Therefore, the description in this specification and the drawings shall be treated to serve illustrative purposes and shall not limit the scope of the invention.

Variation

A description will now be given of variations. In the description of the variations, constituting elements and members identical or equivalent to those of the embodiments shall be denoted by the same reference numerals. Duplicative explanations are omitted appropriately and features different from those of the embodiments will be highlighted.

Variation

In the embodiment described above, control is exercised when the duty values of any two of the U-phase, V-phase, and W-phase of a three-phase AC current are equal to each other so as to delay, by the time $\tau$, the timing of start and the timing of stop of one of the two phases having the equal duty value. In one variation, control may be exercised to delay the timing of start by the time $\tau$, and, at the same time, to advance the timing of stop by the time $\tau$. In other words, the entirety of the pulse signal of the one of the two phases is compressed temporarily instead of shifting the entirety of the pulse signal of one of the phases backward by the time $\tau$ relative to the other pulse signal. In this case, a restriction on $\tau$ ($\tau<T/2-D/2-DT$) to secure the later dead time is not necessary.

According to this embodiment, it is possible to reduce the noise generated when the duty values of two phases of an AC current generated by using PWM are equal to each other.

In this variation, the entirety of the pulse signal of one of the phases in a given period is compressed temporarily so that the current value in that period is decreased. To compensate with this, control may be exercised to add a current value commensurate with the decrease in the next period.

Any combination of the embodiment and a variation will also be useful as an embodiment of the present invention. A new embodiment created by a combination will provide the combined advantages of the embodiment and the variation as combined.

What is claimed is:

1. A three-phase AC control system comprising:
a first three-phase AC control apparatus including: a first equal duty sensing circuit that senses whether a U-phase and a V-phase of a three-phase AC current have an equal duty value; and a PWM signal control circuit that, when it is sensed that the U-phase and the V-phase have the equal duty value, outputs a first control signal that shifts a timing of start and a timing of stop of the U-phase or the V-phase to a PWM signal generation apparatus;
a second three-phase AC control apparatus including: a second equal duty sensing circuit that senses whether the V-phase and a W-phase of the three-phase AC current have an equal duty value; and a second PWM signal control circuit that, when it is sensed that the V-phase and the W-phase have the equal duty value, outputs a second control signal that shifts a timing of start and a timing of stop of the V-phase or the W-phase to the PWM signal generation apparatus;
a third three-phase AC control apparatus including: a third equal duty sensing circuit that senses whether the W-phase and the U-phase of the three-phase AC current have an equal duty value; and a third PWM signal control circuit that, when it is sensed that the W-phase and the U-phase have the equal duty value, outputs a third control signal that shifts a timing of start and a timing of stop of the W-phase or the U-phase to the PWM signal generation apparatus; and the PWM signal generation apparatus that generates a PWM signal based on the first control signal, the second control signal, and the third control signal.

2. The three-phase AC control system according to claim 1, wherein the first PWM signal control circuit outputs, when it is sensed that the U-phase and the V-phase have the equal duty value, the first control signal that shifts a timing of start and a timing of stop of the U-phase to the PWM signal generation apparatus, the second PWM signal control circuit outputs, when it is sensed that the V-phase and the W-phase have the equal duty value, the second control signal that shifts a timing of start and a timing of stop of the V-phase to the PWM signal generation apparatus, and the third PWM signal control circuit outputs, when it is sensed that the W-phase and the U-phase have the equal duty value, the third control signal that shifts a timing of start and a timing of stop of the W-phase to the PWM signal generation apparatus.

* * * * *